(12) United States Patent
Lahti

(10) Patent No.: US 6,471,784 B2
(45) Date of Patent: Oct. 29, 2002

(54) METHOD OF REMOVING SNOW FROM WIPER BLADES

(75) Inventor: Edwin R. Lahti, Houghton, MI (US)

(73) Assignee: Donald J. Johnson, Marquette, MI (US)

( * ) Notice: Subject to any disclaimer, the term of this patent is extended or adjusted under 35 U.S.C. 154(b) by 0 days.

(21) Appl. No.: 09/756,621

(22) Filed: Jan. 8, 2001

(65) Prior Publication Data

US 2002/0088481 A1 Jul. 11, 2002

(51) Int. Cl.⁷ .................................................. B60S 1/32
(52) U.S. Cl. .................. 134/42; 15/250.19; 15/250.351
(58) Field of Search ....................... 15/250.19, 250.001, 15/250.351, 250.352, 250.16, 250.202, 250.203, 250.23; 134/42

(56) References Cited

U.S. PATENT DOCUMENTS

| | | | | |
|---|---|---|---|---|
| 2,784,438 A | * | 3/1957 | Petersen | 15/250.19 |
| 5,487,204 A | * | 1/1996 | Nelson | 15/250.19 |
| 5,571,221 A | | 11/1996 | Kuo et al. | 15/250.19 |
| 5,636,407 A | | 6/1997 | Len | 15/250.19 |
| 5,749,119 A | | 5/1998 | Issac | 15/250.19 |
| 6,129,093 A | | 10/2000 | Kelly | 134/6 |

FOREIGN PATENT DOCUMENTS

| | | | | |
|---|---|---|---|---|
| DE | 3731921 | * | 12/1988 | 15/250.19 |
| GB | 826115 | * | 12/1959 | 15/250.19 |
| JP | 185658 | * | 9/1985 | 15/250.19 |
| JP | 1-103559 | * | 4/1989 | 15/250.19 |

* cited by examiner

Primary Examiner—Gary K. Graham
(74) Attorney, Agent, or Firm—Donald J. Ersler

(57) ABSTRACT

The wiper assembly with impact action includes a wiper arm base, a wiper arm, and an impact motor. The wiper arm base is pivoted by a wiper motor assembly. A roller cam is attached to a shaft of the impact motor. The impact motor is mounted to the wiper arm base. The wiper arm is pivotally attached to the wiper arm base on one end and a wiper blade is attached to the other end of the wiper arm. A contact portion extends from the one end of the wiper arm. The contact portion is structured to be driven by the roller cam on the impact motor. Rotation of the roller cam will cause the wiper blade to momentarily lift off the surface of the windshield. When the wiper blade drops, the resulting impact will cause sleet, ice, or snow on the wiper blade to be knocked-off.

9 Claims, 3 Drawing Sheets

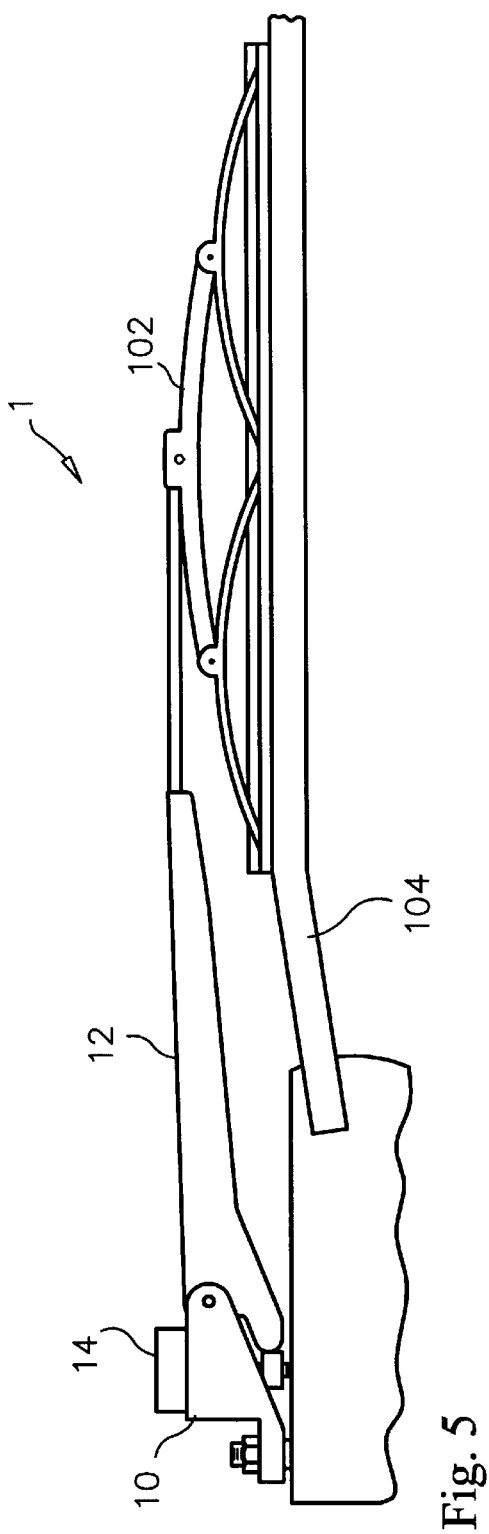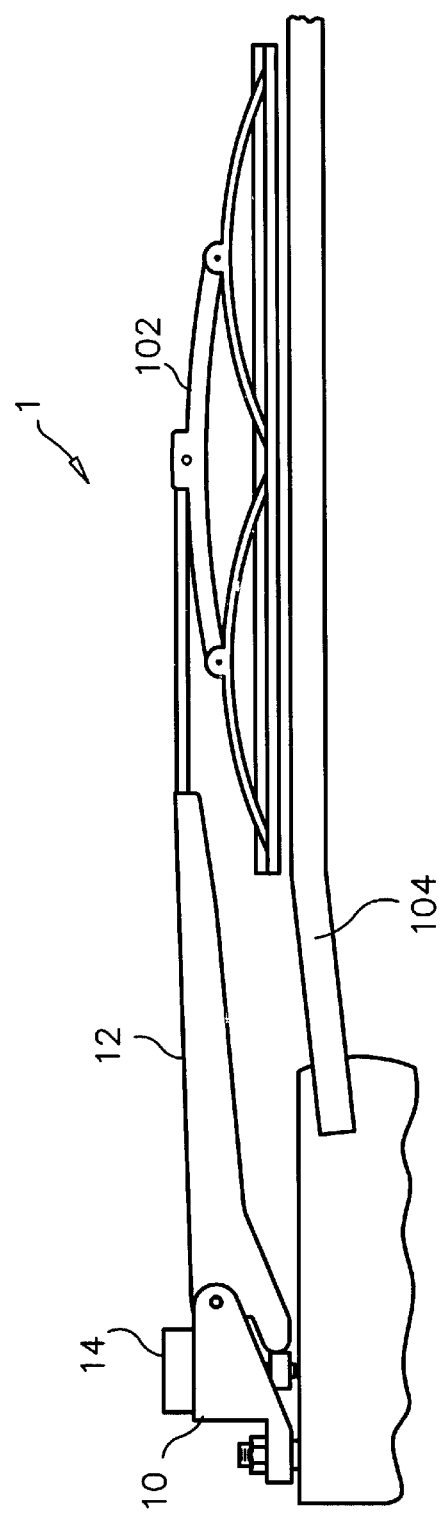

METHOD OF REMOVING SNOW FROM WIPER BLADES

BACKGROUND OF THE INVENTION

1. Field of the Invention

The present invention relates generally to windshield wiper assemblies and more specifically to a windshield wiper assembly with impact action which knocks sleet, ice, or snow off a wiper blade.

2. Discussion of the Prior Art

A problem frequently encountered by motorist is the collection of sleet, ice, or snow on a wiper blade. The removal of the sleet, ice, or snow requires the driver to stop and knock thereof off the wiper blade by hand. Some big semi-truck drivers will have to pull out a ladder and climb on the hood to clean the wiper blades. Some drivers will try to knock-off the sleet, ice, or snow while driving and other drivers will tolerate an obstructed windshield; either scenario creates a driving hazard. Unfortunately, it appears that no device exists commercially to remedy the wiper blade problem.

Accordingly, there is a clearly felt need in the art for a wiper assembly with impact action which knocks sleet, ice, or snow off a wiper blade to increase safety.

SUMMARY OF THE INVENTION

The present invention provides a wiper assembly with impact action that knocks sleet, ice, or snow off a wiper blade. The wiper assembly with impact action includes a wiper arm base, a wiper arm, and an impact motor. The wiper arm base is pivoted by a wiper motor assembly. A roller cam is attached to a shaft of the impact motor. The impact motor is mounted to the wiper arm base. The wiper arm is pivotally attached to the wiper arm base on one end and a wiper blade is attached on the other end of the wiper arm. A contact portion extends from the one end of the wiper arm. A contact surface is formed on an end of the contact portion to mate with the roller cam. Rotation of the roller cam will cause the wiper blade to momentarily lift, off the surface of the windshield. When the wiper blade drops, the resulting impact will cause sleet, ice, or snow on the wiper blade to be knocked-off. The impact motor may be rotated utilizing an electric switch, some type of cycling control, or any other suitable method.

Accordingly, it is an object of the present invention to provide a wiper assembly with impact action which knocks sleet, ice, or snow off a wiper blade.

Finally, it is another object of the present invention to provide a wiper assembly with impact action which increases motorist safety during sleet, ice, or snow conditions.

These and additional objects, advantages, features and benefits of the present invention will become apparent from the following specification.

BRIEF DESCRIPTION OF THE DRAWINGS

FIG. 5 is a side view of a wiper blade resting upon a windshield before being lifted therefrom in accordance with the present invention.

FIG. 6 is a side view of a wiper blade lifted-off a windshield in accordance with the present invention.

DETAILED DESCRIPTION OF THE PREFERRED EMBODIMENTS

Figure 1:
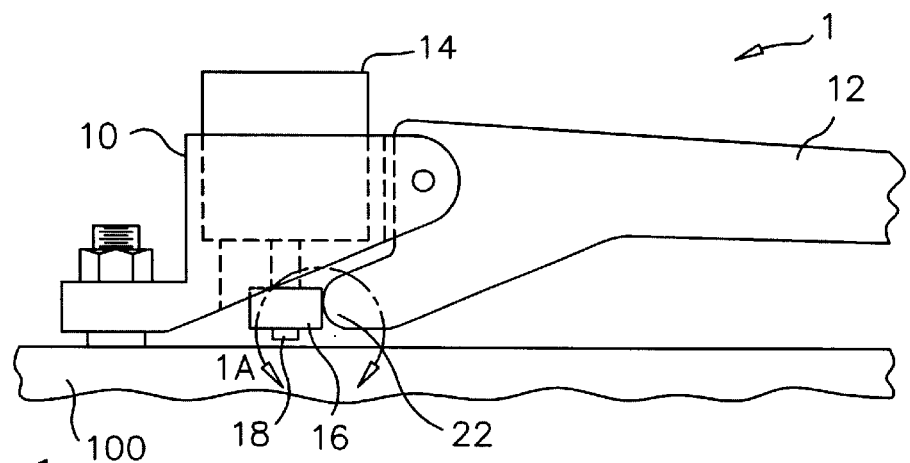
FIG. 1 is a partially enlarged side view of a wiper assembly with impact action in accordance with the present invention.
Figure 2:
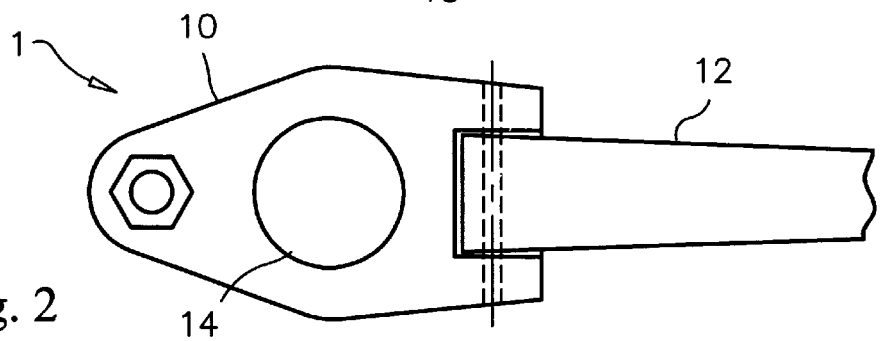
FIG. 2 is a partially enlarged top view of a wiper assembly with impact action in accordance with the present invention.
Figure 3:
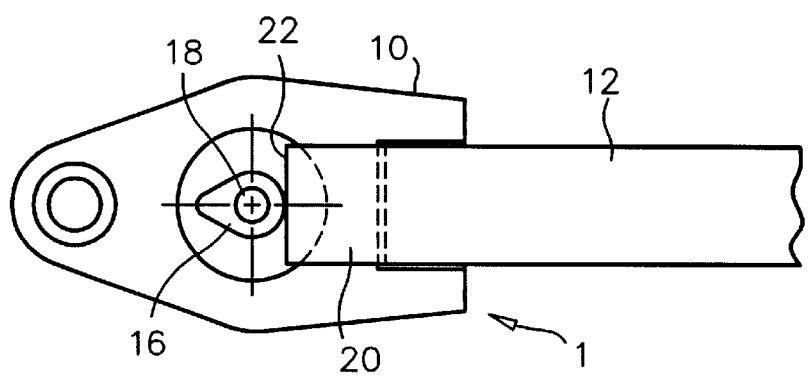
FIG. 3 is a partially enlarged bottom view of a wiper assembly with impact action in accordance with the present invention.

With reference now to the drawings, and particularly to FIG. 1, there is shown a partially enlarged side view of a wiper assembly with impact action 1. With reference to FIGS. 2–3, the wiper assembly with impact action 1 includes a wiper arm base 10, a wiper arm 12, and an impact motor 14. The wiper arm base 10 is pivoted by a wiper motor assembly 100. A roller cam 16 is attached to a shaft 18 of the impact motor 14. The impact motor 14 is mounted to the wiper arm base 10. With reference to FIG. 5, the wiper arm 12 is pivotally attached to the wiper arm base 10 on one end. A wiper blade 102 is attached to the other end of the wiper arm 12.

Figure 1A:
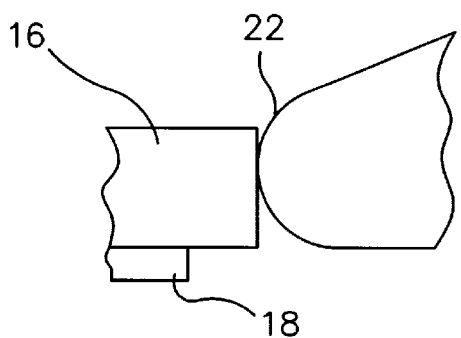
FIG. 1a is a partially enlarged side view of a contact surface of a contact portion in accordance with the present invention.

A contact portion 20 extends from the one end of the wiper arm 12. A contact surface 22 is formed on an end of the contact portion 20. With reference to FIGS. 5 & 6, rotation of the roller cam 16 will cause the wiper blade 102 to momentarily lift, off the surface of the windshield when the impact motor 14 is rotated. With reference to FIG. 1a, the contact surface 22 is preferably curved to provide a smooth transition surface for the roller cam 16 to contact for reducing frictional wear. Preferably, there is a gap between the contact surface 22 and the roller cam 16 when the wiper arm 12 is not elevated to provide maximum impact after lifting. The roller cam 16 preferably has a "tear drop" profile to provide a fast drop with the result that the wiper blade 102 experiences a sudden impact. Other appropriate cam profiles may also be used. The impact motor 14 may be rotated utilizing an electric switch, some type of cycling control, or any other suitable method.

Figure 4:
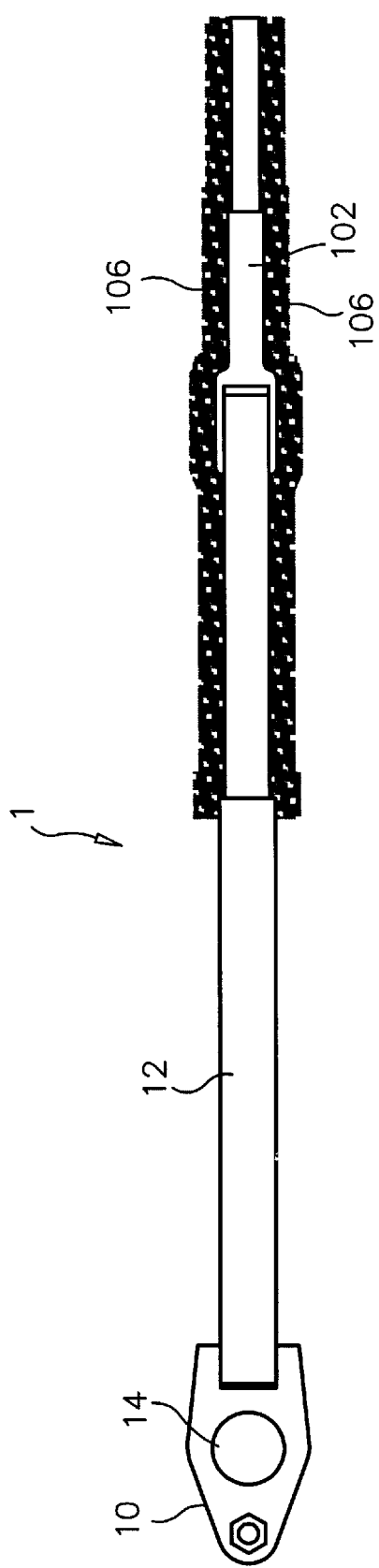
FIG. 4 is a top view of a wiper blade with collected sleet, ice, or snow thereupon in accordance with the present invention.
Figure 7:
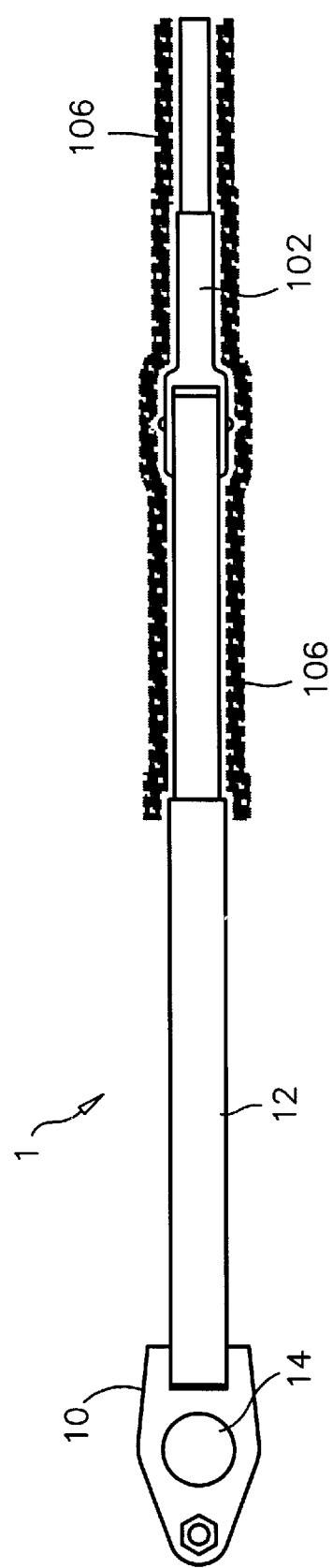
FIG. 7 is a top view of a wiper blade after impact with the windshield in accordance with the present invention.

With reference to FIG. 4, sleet, ice, or snow will collect on any wiper blade used to remove sleet, ice, or snow. Rotating the impact motor 14 will cause the wiper blade 102 to rise momentarily. After the momentary rise, the wiper arm 12 will drop suddenly due to the roller cam 16 profile and gravity. The profile of the roller cam 16 is designed to lift the wiper blade 102 a sufficient distance off the windshield 104 such that the impact therewith is sufficient to knock the sleet, ice, or snow 106 off as shown in FIG. 7.

The wiper assembly with impact action 1 is similar in construction to other prior art wiper assemblies. One design of wiper arm has been shown, but other designs of wiper arms may also be modified to have an impact action. Although a wiper assembly with impact action 1 has been disclosed for windshields, the wiper assembly with impact action 1 may also be used for mirrors, headlights, or any other suitable application. The impact motor 14 is disclosed as mounted to the wiper arm base 10, but the impact motor 14 could also be mounted to the wiper arm 12 and a contact surface formed on the wiper arm base 10.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method of removing sleet, ice, or snow from a wiper blade of a wiper assembly, comprising the steps of:

(a) providing an impact motor with a roller cam;
   (b) providing a wiper arm base;
   (c) attaching pivotally one end of a wiper arm to said wiper arm base, attaching the wiper blade to the other end of said wiper arm;
   (d) creating a contact portion on said wiper arm, a contact surface having a curved shape being formed on an end of said contact portion, said impact motor being located such that said contact surface mates with said roller cam; and
   (e) rotating said impact motor to raise said wiper blade above a wiping surface.

2. The method of removing sleet, ice, or snow from a wiper blade of a wiper assembly of claim 1, wherein:

said roller cam having a profile which suddenly drops said wiper blade from an elevated orientation.

3. The method of removing sleet, ice, or snow from a wiper blade of a wiper assembly of claim 1, wherein:

said impact motor being mounted to said wiper arm base.

4. The method of removing sleet, ice, or snow from a wiper blade of a wiper assembly of claim 1, wherein:

said impact motor being mounted to said wiper arm base.

5. A method of removing sleet, ice, or snow from a wiper blade of a wiper assembly, comprising the steps of:

(a) providing an impact motor with a roller cam;
   (b) providing a wiper arm base, said impact motor being mounted to said wiper arm base;
   (c) attaching pivotally one end of a wiper arm to said wiper arm base, attaching the wiper blade to the other end of said wiper arm;
   (d) creating a contact portion on said wiper arm, a contact surface having a curved shape being formed on an end of said contact portion, said impact motor being located such that said contact surface mates with said roller cam; and
   (e) rotating said impact motor to raise said wiper blade above a wiping surface.

6. The method of removing sleet, ice, or snow from a wiper blade of a wiper assembly of claim 5, wherein:

said roller cam having a profile which suddenly drops said wiper blade from an elevated orientation.

7. A method of removing sleet, ice, or snow from a wiper blade of a wiper assembly, comprising the steps of:

(a) providing an impact motor with a roller cam;
   (b) providing a wiper arm base, said impact motor being mounted to said wiper arm base;
   (c) attaching pivotally one end of a wiper arm to said wiper arm base, attaching the wiper blade to the other end of said wiper arm;
   (d) creating a contact portion on said wiper arm, a contact surface being formed on an end of said contact portion, said impact motor being located such that said contact surface mates with said roller cam;
   (e) rotating said impact motor to raise said wiper blade above a wiping surface; and
   (f) dropping said wiper blade suddenly on to said wiping surface to knock the sleet, ice, or snow therefrom.

8. The method of removing sleet, ice, or snow from a wiper blade of a wiper assembly of claim 7, wherein:

said roller cam having a profile which suddenly drops said wiper blade from an elevated orientation.

9. The method of removing sleet, ice, or snow from a wiper blade of a wiper assembly of claim 7, further comprising:

said contact surface having a curved shape to allow a smooth transition surface for the roller cam to contact.

* * * * *